United States Patent
Alpers et al.

(10) Patent No.: US 9,208,198 B2
(45) Date of Patent: Dec. 8, 2015

(54) TECHNIQUE FOR FACTORING UNCERTAINTY INTO COST-BASED QUERY OPTIMIZATION

(71) Applicant: International Business Machines Corporation, Armonk, NY (US)

(72) Inventors: Jason L. Alpers, Lee's Summit, MO (US); Thomas A. Beavin, Milpitas, CA (US); Patrick D. Bossman, Sarasota, FL (US); Shuanglin Guo, Cupertino, CA (US); Terence P. Purcell, Springfield, IL (US)

(73) Assignee: International Business Machines Corporation, Armonk, NY (US)

( * ) Notice: Subject to any disclaimer, the term of this patent is extended or adjusted under 35 U.S.C. 154(b) by 530 days.

(21) Appl. No.: 13/653,515

(22) Filed: Oct. 17, 2012

(65) Prior Publication Data

US 2014/0108378 A1    Apr. 17, 2014

(51) Int. Cl.
    *G06F 17/30*    (2006.01)
(52) U.S. Cl.
    CPC ................ *G06F 17/30469* (2013.01)
(58) Field of Classification Search
    CPC .............. G06F 17/30442; G06F 17/30536; G06F 17/30463; G06F 17/30469; G06F 17/30595; G06F 17/30935; G06F 17/30979; G06F 11/3688; G06F 11/3692
    See application file for complete search history.

(56) References Cited

U.S. PATENT DOCUMENTS

| | | | |
|---|---|---|---|
| 6,865,567 B1 | 3/2005 | Oommen et al. | |
| 6,931,389 B1* | 8/2005 | Bleizeffer et al. | 1/1 |
| 7,007,009 B2 | 2/2006 | Bestgen et al. | |
| 7,080,062 B1* | 7/2006 | Leung et al. | 1/1 |
| 7,805,443 B2 | 9/2010 | Konig et al. | |
| 2009/0094191 A1 | 4/2009 | Chaudhuri et al. | |
| 2010/0114870 A1 | 5/2010 | Al-Omari et al. | |
| 2012/0060142 A1 | 3/2012 | Fliess et al. | |

OTHER PUBLICATIONS

Antoshenkov, G. (1993). Dynamic query optimization in Rdb/VMS. Ninth International Conference on Data Engineering, 1993. Proceedings.538-547. Doi: 10.1109/ICDE.1993.344026: See figure 2.2.

Khachatryan, K., & Böhm, K. (2010). Quantifying uncertainty in multi-dimensional cardinality estimations. In Proceedings of the 19th ACM international conference on Information and knowledge management (CIKM '10). ACM. 1317-1320. Doi:/10.1145/1871437.1871610.

(Continued)

*Primary Examiner* — Angelica Ruiz
(74) *Attorney, Agent, or Firm* — Gates & Cooper LLP

(57) ABSTRACT

A technique for factoring uncertainty into cost-based query optimization includes: determining the degree of uncertainty involved in the cost estimates for the query, determining the degree of sensitivity the query has to that uncertainty, and determining if there is an access path that performs well across the range of possible conditions that could occur at execution time, reducing the risk of performance spikes and performance volatility. If such an access path exists, select that access path; if not, perform parametric query optimization or query re-optimization.

20 Claims, 4 Drawing Sheets

(56) References Cited

OTHER PUBLICATIONS

Markl, V., Raman, V., Simmen, D. et al. (2004). Robust query processing through progressive optimization. In Proceedings of the 2004 ACM SIGMOD International Conference on Management of Data (SIGMOD '04). ACM. Doi: 10.1145/1007568.1007642 : See abstract & section 7.

Singh, S., Mayfield, C., Shah, R. et al. (2008). Query selectivity estimation for uncertain database. In Proceedings of the 20th international conference on Scientific and Statistical Database Management (SSDBM '08). 61-78. Doi://dx.doi.org/10.1007/978-3-540-69497-7_7: See section 3.

* cited by examiner

TECHNIQUE FOR FACTORING UNCERTAINTY INTO COST-BASED QUERY OPTIMIZATION

BACKGROUND OF THE INVENTION

1. Field of the Invention

This invention relates in general to database management systems performed by computers, and in particular, to a technique for factoring uncertainty into cost-based query optimization.

2. Description of Related Art

Computer systems incorporating Relational DataBase Management System (RDBMS) software using a Structured Query Language (SQL) interface are well known in the art. The SQL interface has evolved into a standard language for RDBMS software and has been adopted as such by both the American National Standards Institute (ANSI) and the International Standards Organization (ISO).

An important aspect of the RDBMS software is the optimization of the SQL queries. Typically, the RDBMS software will include a cost-based optimizer function that chooses among a plurality of possible access paths in order to select an optimal query execution plan. Choosing sub-optimal query execution plans can be detrimental for query performance.

Cost-based query optimizers must sometimes make assumptions about the data being queried. The assumptions typically are:

Uniform data distribution, and

Independence amongst predicate conditions.

However, these assumptions will not always be true. Often, the data will not be uniformly distributed and there will be correlation amongst the specified predicate conditions. The assumptions, therefore, lead to uncertainty that the cost estimate computed by the optimizer is accurate. Naturally, if the cost estimate is not accurate, the selected access path may perform poorly.

Typically, cost-based query optimizers attempt to deal with this uncertainty by eliminating it whenever possible. This is usually accomplished through the collection of detailed statistics, and perhaps through the use of statistical views, statistics advisors, feedback mechanisms, or other means.

When the query involves predicates with host-variables, i.e., data items declared in an SQL statement with their values determined at runtime, collecting additional statistics may do little to reduce the uncertainty. In these cases, traditional cost-based query optimizers may defer the optimization until execution time, when the host-variable values are known, or use techniques to feed back information from prior executions of the query (i.e., the "learning optimizer" technique) in order to improve the accuracy of the cost-estimates made by the query optimizer over many executions of the query.

While eliminating, or minimizing, the degree of uncertainty involved in estimating the cost of performing a particular query is desirable, it cannot always be achieved, and often the cost associated with identifying and collecting the statistics needed to significantly reduce uncertainty, or the cost of learning the execution properties of the query to the extent needed to more accurately optimize the query, can be extremely high.

Thus, there is a need in the art for improved optimization techniques that ensure the selection of optimal (or near optimal) access paths for queries using cost-based optimization. Specifically, there is a need in the art for solutions to problems directed to the selection of optimal plans using a technique for factoring uncertainty into cost-based query optimization.

SUMMARY OF THE INVENTION

To overcome the limitations in the prior art described above, and to overcome other limitations that will become apparent upon reading and understanding the present specification, the present invention discloses a method, apparatus, and article of manufacture for optimizing a query in a computer system, which is a technique for factoring uncertainty into cost-based query optimization. The present invention includes: determining the degree of uncertainty involved in the cost estimates for the query, determining the degree of sensitivity the query has to that uncertainty, and determining if there is an access path that performs well across the range of possible conditions that could occur at execution time, reducing the risk of performance spikes and performance volatility. If such an access path exists, select that access path; if not, perform parametric query optimization or query re-optimization.

BRIEF DESCRIPTION OF THE DRAWINGS

Referring now to the drawings in which like reference numbers represent corresponding parts throughout.

DETAILED DESCRIPTION OF THE PREFERRED EMBODIMENT

In the following description of the preferred embodiment, reference is made to the accompanying drawings, which form a part hereof, and in which is shown by way of illustration a specific embodiment in which the invention may be practiced. It is to be understood that other embodiments may be utilized and structural and functional changes may be made without departing from the scope of the present invention.

Overview

The present invention proposes a different approach from the prior art: one that recognizes that uncertainty is inherent in cost-based query optimization and factors that uncertainty into the access path selection process. The result is a cost-based query optimizer that selects access paths that perform well across a range of possible conditions, providing more consistent performance results, even in the presence of high uncertainty.

The present invention also enables the cost-based query optimizer to recognize and target those queries for which there is not a single plan that performs well across the range of possible conditions. Those queries can be optimized using techniques such as parametric query optimization, which selects multiple access paths for the query rather than a single access path and routes control to the appropriate access path at execution time based on the execution parameters of the query, or query re-optimization, which defers determining the access path until execution time when the execution parameters are known.

Some papers have been written which discuss the idea of viewing predicate selectivity as a probability distribution rather than a single selectivity estimate, but they require pre-processing to compute the probability distribution from a random sample, or additional processing during optimization to construct samples on the fly, or feedback from previous executions of the query to determine the probability distribution. In all of these cases, there is high overhead involved in obtaining the probability distribution. Additionally, the probability distribution itself is also prone to uncertainty, and techniques that rely on cost estimates based upon probability distributions may still experience erratic performance behavior.

The present invention avoids the costly overhead associated with probability distributions, and also avoids being dependent on accurate probability distribution values, in order to select the best plan for a range of possible conditions. It also can identify and target those queries that are best suited to parametric query optimization or other optimization techniques without incurring the high over-head associated with probability distributions.

Hardware and Software Environment

Figure 1:
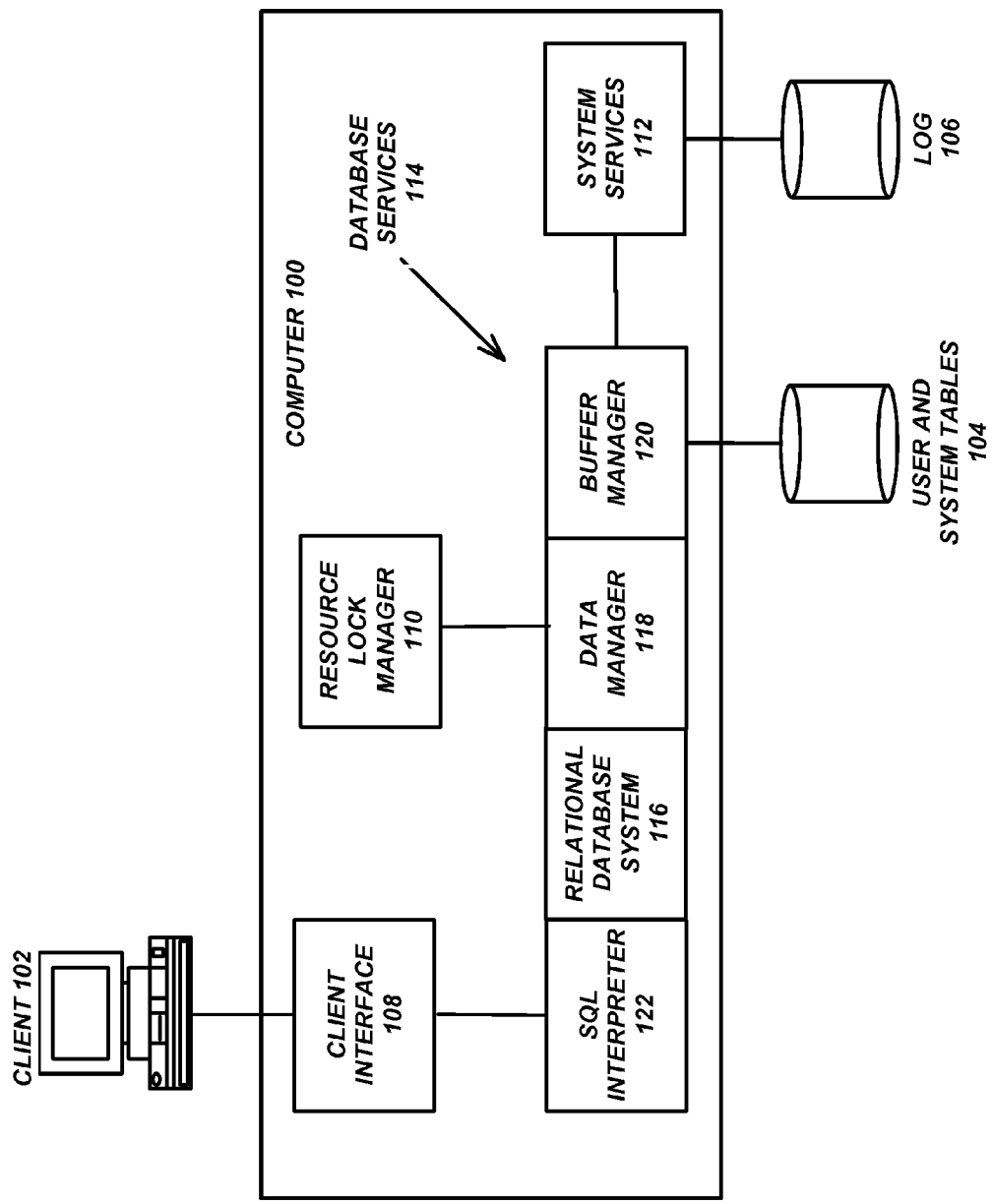
FIG. 1 illustrates an exemplary computer hardware and software environment that could be used with an embodiment of the present invention.

FIG. 1 illustrates an exemplary computer hardware and software environment that could be used with the present invention. In the exemplary environment, a server system 100 is connected to one or more client systems 102, in order to manage one or more databases 104 and 106 shared among the client systems 102.

Operators of the client systems 102 use a standard operator interface 108 to transmit commands to and from the server system 100 that represent commands for performing various search and retrieval functions, termed queries, against the databases. In the present invention, these queries conform to the Structured Query Language (SQL) standard, and invoke functions performed by Relational DataBase Management System (RDBMS) software. In one embodiment of the present invention, the RDBMS software comprises the DB2 product offered by IBM Corporation, the assignee of the present invention. Those skilled in the art will recognize, however, that the present invention has application to any RDBMS software.

As illustrated in FIG. 1, the RDBMS includes three major components: the Resource Lock Manager (RLM) 110, the Systems Services module 112, and the Database Services module 114. The RLM 110 handles locking services, because the RDBMS treats data as a shared resource, thereby allowing any number of users to access the same data simultaneously, and thus concurrency control is required to isolate users and to maintain data integrity. The Systems Services module 112 controls the overall RDBMS execution environment, including managing log data sets 106, gathering statistics, handling startup and shutdown, and providing management support.

At the heart of the RDBMS architecture is the Database Services module 114. The Database Services module 114 contains several submodules, including a Relational Database System (RDS) 116, Data Manager 118, Buffer Manager 120, and SQL Interpreter 122. These submodules support the functions of the SQL language, i.e., definition, access control, retrieval, and update of user and system data.

Generally, each of the components, modules, and submodules of the RDBMS comprises instructions and/or data, and are embodied in or retrievable from a computer-readable device or medium, e.g., a memory, a data storage device, a remote device coupled to the server computer 100 by a data communications device, etc. Moreover, these instructions and/or data, when read, executed, and/or interpreted by the server computer 100, cause the server computer 100 to perform the steps necessary to implement and/or use the present invention.

Thus, the present invention may be implemented as a method, apparatus, or article of manufacture using standard programming and/or engineering techniques to produce software, firmware, hardware, or any combination thereof. The term "article of manufacture", or alternatively, "computer program product", as used herein is intended to encompass a computer program accessible from any computer-readable device or media.

Of course, those skilled in the art will recognize many modifications may be made to this configuration without departing from the scope of the present invention. Specifically, those skilled in the art will recognize that any combination of the above components, or any number of different components, including computer programs, peripherals, and other devices, may be used to implement the present invention, so long as similar functions are performed thereby.

Interactive SQL Execution

Figure 2:
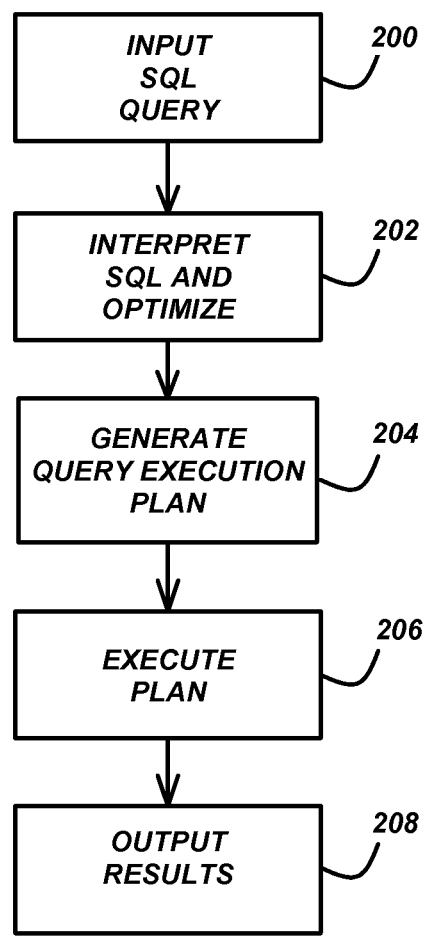
FIG. 2 is a flowchart illustrating the steps necessary for the interpretation and execution of SQL statements in an interactive environment according to an embodiment of the present invention.

FIG. 2 is a flowchart illustrating the steps necessary for the interpretation and execution of SQL statements in an interactive environment according to the present invention. Block 200 represents the input of SQL statements into the server system 100. Block 202 represents the step of compiling or interpreting the SQL statements in the RDBMS. A cost-based optimizer function within the RDBMS may transform or optimize the SQL query in a manner described in more detail later in this specification. Generally, the SQL statements received as input specify only the desired data, but not how to retrieve the data. This step considers both the available access paths (indexes, sequential reads, etc.) and system held statistics on the data to be accessed (the size of the table, the number of distinct values in a particular column, etc.), to choose what it considers to be the most efficient access path for the query. Block 204 represents the step of generating a compiled set of runtime structures called a query execution plan from the compiled SQL statements, wherein each query execution plan represents a different access path. Block 206 represents the execution of the plan and Block 208 represents the output of the results.

Embedded/Batch SQL Execution

Figure 3:
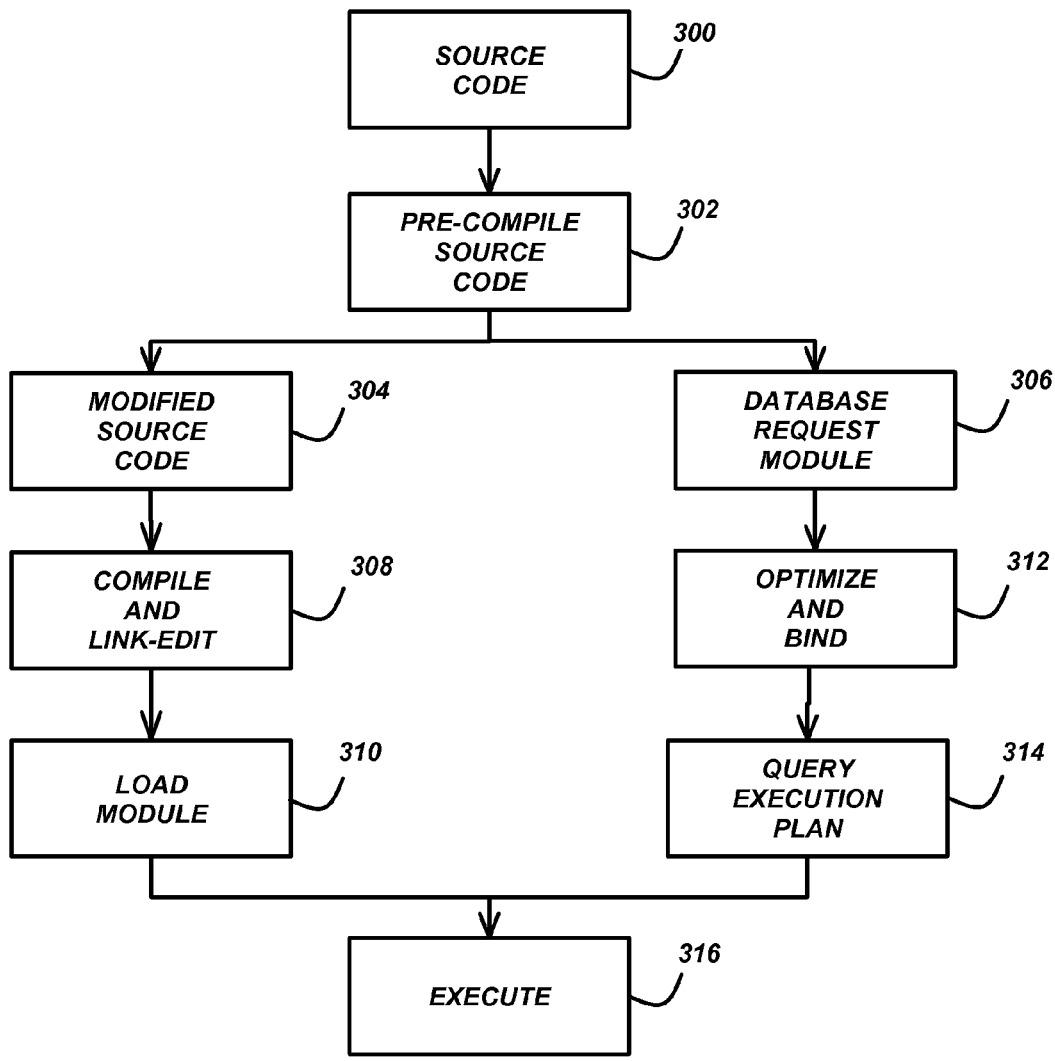
FIG. 3 is a flowchart illustrating the steps necessary for the interpretation and execution of SQL statements embedded in source code of a host language according to an embodiment of the present invention.

FIG. 3 is a flowchart illustrating the steps necessary for the interpretation and execution of SQL statements embedded in source code according to the present invention. Block 300 represents program source code containing a host language (such as COBOL or C) and embedded SQL statements. The program source code is then input to a pre-compile step 302. There are two outputs from the pre-compile step 302: a modified source module 304 and a Database Request Module (DBRM) 306. The modified source module 304 contains host language calls to the RDBMS, which the pre-compile step 302 inserts in place of SQL statements. The DBRM 306 is comprised of the SQL statements from the program source code 300. A compile and link-edit step 308 uses the modified source module 304 to produce a load module 310, while an optimize and bind step 312 uses the DBRM 306 to produce a compiled set of runtime structures for the query execution plan 314. As indicated above in conjunction with FIG. 2, the SQL statements from the program source code 300 specify only the desired data, but not how to retrieve the data. The optimize and bind step 312 may represent a cost-based optimizer function within the RDBMS that optimizes the SQL query in a manner described in more detail later in this specification. Thereafter, the optimize and bind step 312 considers both the available access paths (indexes, sequential reads, etc.) and system held statistics on the data to be accessed (the size of the table, the number of distinct values in a particular column, etc.), to choose what it considers to be the most efficient plan for the query. The load module 310 and plan 314 are then executed together at step 316.

Description of the Optimization Technique

The present invention discloses an improved optimization technique that is typically performed at step 202 of FIG. 2 or step 312 of FIG. 3. Specifically, the present invention discloses a technique for factoring uncertainty into cost-based query optimization.

Factoring Uncertainty into Cost-Based Query Optimization

The core idea of the present invention is to give the cost-based query optimizer function of the RDBMS knowledge about the degree of uncertainty involved in its cost estimates, and knowledge about the degree of sensitivity that the query has to that uncertainty. With that knowledge, the cost-based query optimizer is then enabled to choose an access path that performs well across the range of possible conditions that could occur at execution time, reducing the risk of performance spikes and performance volatility. Moreover, with that knowledge, the cost-based query optimizer is also enabled to recognize queries that are well suited to parametric query optimization or query re-optimization, and automatically perform those optimization techniques on those queries.

Generally, the present invention involves the following steps:
  Determine the degree of uncertainty involved in the query,
  Determine the degree of sensitivity the query has to the uncertainty,
  Determine if there is a single access path that performs well across the range of possible conditions,
  If such an access path exists, select that access path; if not, perform parametric query optimization or query re-optimization.
  Determine the Degree of Uncertainty To determine the degree of uncertainty, the cost-based query optimizer is extended such that it considers not just one set of assumptions about the underlying data, but multiple assumptions. That is, in addition to estimating the cost of the query using the "normal" or standard assumptions of "uniform data distribution" and "independence of predicate conditions," the optimizer will also estimate the cost of the query using "pessimistic" and "optimistic" assumptions about the data.

Pessimistic assumptions include (but are not limited to):
  Positive data skew (i.e., where the data is skewed toward the predicate conditions), and
  Positive correlation among predicate conditions (i.e., if one predicate condition evaluates as "TRUE," then other predicate conditions also tend to evaluate as "TRUE").
Optimistic assumptions include (but are not limited to):
Negative data skew (i.e., where data is skewed away from the predicate conditions), and
  Negative correlation among predicate conditions (i.e., if one predicate condition evaluates as "TRUE," then other predicate conditions tend to evaluate as "FALSE").

Pessimistic assumptions result in estimates that predict more rows will be qualified by the query, while optimistic assumptions result in estimates that predict fewer rows will be qualified by the query.

Note that these assumptions can be characterized as "selectivity models," namely a normal selectivity model, an optimistic selectivity model and a pessimistic selectivity model, in one embodiment of the invention. However, the present invention is not limited to just these three models. Instead, there could be an arbitrary number of selectivity models that are used to cost queries. Moreover, these selectivity models can represent any set of selectivity assumptions. The choice of normal, optimistic and pessimistic selectivity models in this embodiment is for illustration only, as giving the most generic coverage of possible outcomes, but other selectivity models, and combinations of selectivity models, which may be based on heuristics, monitoring, statistical analysis, etc., could be used in place of, or in addition to, the normal, optimistic and pessimistic selectivity models described herein.

When the cost-based query optimizer evaluates the query from the perspectives of chosen selectivity models, it gives the optimizer a clearer picture as to how each candidate access path being considered performs under the conditions associated with those selectivity models.

For example, consider the following table, which describes a resulting "cost-matrix" for access paths associated with plans 'A', 'B' and 'C':

|  | Normal Selectivity Assumptions | Pessimistic Selectivity Assumptions | Optimistic Selectivity Assumptions |
| --- | --- | --- | --- |
| Plan A - Best plan using normal assumptions | Cost of Plan A using normal assumptions | Cost of Plan A using pessimistic assumptions | Cost of Plan A using optimistic assumptions |
| Plan B - Best plan using pessimistic assumptions | Cost of Plan B using normal assumptions | Cost of Plan B using pessimistic assumptions | Cost of Plan B using optimistic assumptions |
| Plan C - Best plan using optimistic assumptions | Cost of Plan C using normal assumptions | Cost of Plan C using pessimistic assumptions | Cost of Plan C using optimistic assumptions |

From the cost-matrix, plans A, B and C can be compared to see which one performs best across the range of selectivity models or assumptions.

Note that, when doing this comparison, the selectivity assumptions can be weighted differently. That is, more weight can be given to the normal selectivity assumptions and less weight to the pessimistic and optimistic selectivity assumptions. This accounts for the possibility that the normal selectivity assumptions are more likely to occur than the pessimistic or optimistic selectivity assumptions.

The degree of uncertainty for a particular access path can be calculated as the difference between the normal, pessimistic, and optimistic estimated costs for that access path. The greater the difference in cost, the greater the degree of uncertainty. The smaller the difference, the smaller the degree of uncertainty.

For example, consider the following costs for access paths associated with plans 'A', 'B' and 'C':

|  | Normal Selectivity Assumptions | Pessimistic Selectivity Assumptions | Optimistic Selectivity Assumptions | Uncertainty |
|---|---|---|---|---|
| Plan A - best plan using normal selectivity | Cost = 1E+3 | Cost = 1E+5 | Cost = 1E+2 | 9.99E+004 |
| Plan B - best plan using pessimistic selectivity | Cost = 4E+3 | Cost = 5E+3 | Cost = 1E+3 | 4.00E+003 least uncertain |
| Plan C - best plan using optimistic selectivity | Cost = 2E+3 | Cost = 1E+7 | Cost = 5E+1 | 9.99E+006 most uncertain |
| Sensitivity | 3.00E+003 | 9.99E+006 most sensitive | 9.50E+001 least sensitive | |

The estimated costs for plan 'A' range from 1E+2 to 1E+5; the estimated costs for plan 'B' range from 1E+3 to 5E+3 (smallest degree of uncertainty); and the estimated costs for plan 'C' range from 5E+1 to 1E+7 (largest degree of uncertainty). This shows a high degree of uncertainty across the competing access path choices.

Determine the Degree of Sensitivity

The degree of sensitivity that a query has to the uncertainty about the cost of a particular plan can be calculated as the difference between the costs of different access paths for the same selectivity assumption.

Using the example above: sensitivity under normal assumptions range from 1E+3 to 4E+3 sensitivity under pessimistic assumptions range from 5E+3 to 1E+7 (most sensitive); and sensitivity under optimistic assumptions range from 5E+1 to 1E+3 (least sensitive). This shows a high level of sensitivity within the query, especially within the pessimistic selectivity model.

The following table describes the relationship between uncertainty and sensitivity:

|  | Low uncertainty | High uncertainty |
|---|---|---|
| Low sensitivity | Stable | Stable |
| High sensitivity | Stable | Unstable |

The table shows that a query may have high uncertainty, but if the query is not sensitive to that uncertainty, then the uncertainty is not a problem.

An example would be a query with the following predicate: "AGE<?". This type of predicate typically has high uncertainty because the value of the parameter marker "?" is not known until execution time. The predicate may qualify all rows or no rows, and the query optimizer does not know which will occur at execution time (hence, there is high uncertainty). However, if there is no index on AGE, and the table is not joined to any other table, then that uncertainty may not have any impact on the query, because that predicate is not critical to any of the competing access paths.

These cases typically do not benefit from attempts to reduce the uncertainty, and so there is no need to consider statistical views or a statistics advisor to eliminate the uncertainty. Likewise, these cases do not benefit from parametric query optimization or query re-optimization, because knowing the execution parameters does not help the optimizer select a better access path.

The table shows that those queries with high uncertainty and high sensitivity are the cases where statistical views and a statistics advisor should be considered. Those queries with high uncertainty and high sensitivity are also the cases where parametric query optimization, or query re-optimization may be highly beneficial.

Logic of the Cost-Based Query Optimizer

Figure 4:
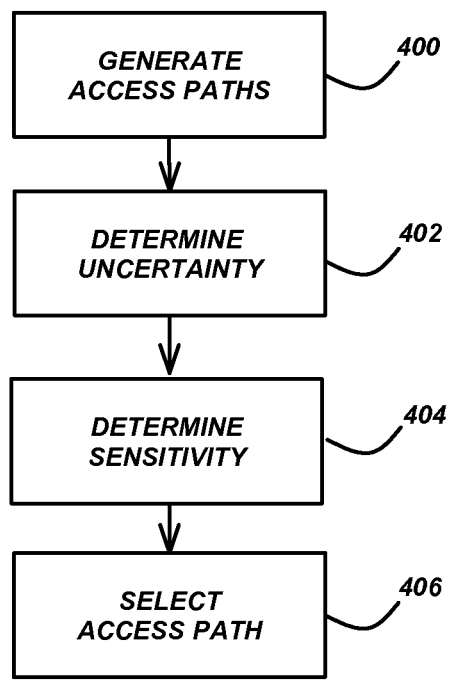
FIG. 4 is a flowchart illustrating the logic of the method for query optimization according to the preferred embodiment of the present invention.

FIG. 4 is a flow chart that illustrates the logic performed by the cost-based query optimizer function of the RDBMS according to one embodiment of the present invention. Specifically, the flow chart illustrates a method of generating an optimal access path to data for a query.

Block 400 represents the RDBMS generating a plurality of access paths for the query.

Block 402 represents the RDBMS determining an uncertainty for the query, wherein the uncertainty is the difference between selectivity assumptions about the costs for each of the access paths. For example, the uncertainty may be the difference between normal, pessimistic or optimistic selectivity assumptions about the costs for the access path.

As noted above, the normal selectivity assumptions may comprise uniform data distribution or independence of predicate conditions; the pessimistic selectivity assumptions may comprise positive data skew (where data is skewed toward predicate conditions) or positive correlation among predicate conditions (such that, if one predicate condition evaluates as true, then other predicate conditions also tend to evaluate as true); and the optimistic selectivity assumptions may comprise negative data skew (where data is skewed away from predicate conditions) or negative correlation among predicate conditions (such that, if one predicate condition evaluates as true, then other predicate conditions tend to evaluate as false). Generally, the pessimistic selectivity assumptions result in estimates that predict more rows will be qualified by the query, while the optimistic selectivity assumptions result in estimates that predict fewer rows will be qualified by the query.

Moreover, the selectivity assumptions may be weighted differently. For example, the normal, pessimistic or optimistic selectivity assumptions may be weighted differently, with more weight given to the normal selectivity assumptions and less weight given to the pessimistic and optimistic selectivity assumptions.

Block 404 represents the RDBMS determining a sensitivity of the query to the uncertainty, wherein the sensitivity is the difference between the costs of the access paths for the selectivity assumptions. For example, the sensitivity may be the difference between the costs of the access paths for the normal, pessimistic and optimistic selectivity assumptions.

Block 406 represents the RDBMS selecting one of the access paths according to the uncertainty and the sensitivity. Specifically, this Block determines if there is a single access path that performs well across the range of possible conditions. If such an access path exists, then that access path is selected; if not, then parametric query optimization or query re-optimization may be performed at a later time.

Thereafter, the logic terminates.

Summary

In summary, the approach described in the present invention, extending cost-based query optimization to factor uncertainty into the access path selection process, is a simple and yet powerful and elegant solution for dealing with the uncertainty that is inherent in cost-based query optimization. It does not require expensive, and possibly wasteful, prior analysis of the workload in order to create statistical views or collect detailed statistics in attempts to eliminate uncertainty. It also does not require preprocessing to sample and compute probability distributions. It simply enables the optimizer to recognize that the assumptions it makes may not be accurate in all cases, and that by considering other assumptions, and viewing the query from multiple perspectives, better performing access paths can be selected that are less likely to suffer performance spikes or perform erratically across many executions of the query.

CONCLUSION

This concludes the description of the preferred embodiment of the invention. The following describes some alternative embodiments for accomplishing the present invention. For example, any type of computer, such as a mainframe, minicomputer, or personal computer, could be used with the present invention. In addition, any software program performing database queries could benefit from the present invention.

In summary, the present invention discloses a method, apparatus, and article of manufacture for optimizing a query in a computer system, which includes a technique for factoring uncertainty into cost-based query optimization.

The foregoing description of the preferred embodiment of the invention has been presented for the purposes of illustration and description. It is not intended to be exhaustive or to limit the invention to the precise form disclosed. Many modifications and variations are possible in light of the above teaching.

What is claimed is:

1. An apparatus for generating an optimal access path to data for a query being performed by a computer system to retrieve data from a database stored in a data storage device coupled to the computer system, the apparatus comprising:
    (a) a computer system having a data storage device coupled thereto, the data storage device storing data in a database; and
    (b) a relational database management system performed by the computer system, the relational database management system configured for:
    generating a plurality of access paths for the query;
    determining an uncertainty for the query, wherein the uncertainty is the difference between selectivity assumptions about the costs for each of the access paths;
    determining a sensitivity of the query to the uncertainty, wherein the sensitivity is the difference between the costs of the access paths for the selectivity assumptions; and
    selecting one of the access paths according to the uncertainty and the sensitivity;
    wherein the selectivity assumptions comprise normal, pessimistic or optimistic selectivity assumptions, the uncertainty is the difference between the normal, pessimistic or optimistic selectivity assumptions about the costs for each of the access paths, and the sensitivity is the difference between the costs of the access paths for the normal, pessimistic or optimistic selectivity assumptions.

2. The apparatus of claim 1, wherein the normal selectivity assumptions comprise uniform data distribution.

3. The apparatus of claim 1, wherein the normal selectivity assumptions comprise independence of predicate conditions.

4. The apparatus of claim 1, wherein the pessimistic selectivity assumptions comprise positive data skew where data is skewed toward predicate conditions.

5. The apparatus of claim 1, wherein the pessimistic selectivity assumptions comprise positive correlation among predicate conditions, such that, if one predicate condition evaluates as true, then other predicate conditions also tend to evaluate as true.

6. The apparatus of claim 1, wherein the pessimistic selectivity assumptions result in estimates that predict more rows will be qualified by the query.

7. The apparatus of claim 1, wherein the optimistic selectivity assumptions comprise negative data skew where data is skewed away from predicate conditions.

8. The apparatus of claim 1, wherein the optimistic selectivity assumptions comprise negative correlation among predicate conditions, such that, if one predicate condition evaluates as true, then other predicate conditions tend to evaluate as false.

9. The apparatus of claim 1, wherein the optimistic selectivity assumptions result in estimates that predict fewer rows will be qualified by the query.

10. The apparatus of claim 1, wherein the normal, pessimistic and optimistic selectivity assumptions are weighted differently, with more weight given to the normal selectivity assumptions and less weight given to the pessimistic and optimistic selectivity assumptions.

11. An article of manufacture comprising a computer readable storage medium encoded with computer program instructions which, when accessed by a computer system storing data in a database, cause the computer system to operate as a specially programmed computer system, executing a method of generating an optimal access path to data for a query being performed by the computer system to retrieve data from the database, the method comprising:
    generating a plurality of access paths for the query;
    determining an uncertainty for the query, wherein the uncertainty is the difference between selectivity assumptions about the costs for each of the access paths;
    determining a sensitivity of the query to the uncertainty, wherein the sensitivity is the difference between the costs of the access paths for the selectivity assumptions; and
    selecting one of the access paths according to the uncertainty and the sensitivity;
    wherein the selectivity assumptions comprise normal, pessimistic or optimistic selectivity assumptions, the uncertainty is the difference between the normal, pessimistic or optimistic selectivity assumptions about the costs for each of the access paths, and the sensitivity is the difference between the costs of the access paths for the normal, pessimistic or optimistic selectivity assumptions.

12. The article of claim 11, wherein the normal selectivity assumptions comprise uniform data distribution.

13. The article of claim 11, wherein the normal selectivity assumptions comprise independence of predicate conditions.

14. The article of claim 11, wherein the pessimistic selectivity assumptions comprise positive data skew where data is skewed toward predicate conditions.

15. The article of claim 11, wherein the pessimistic selectivity assumptions comprise positive correlation among predicate conditions, such that, if one predicate condition evaluates as true, then other predicate conditions also tend to evaluate as true.

16. The article of claim 11, wherein the pessimistic selectivity assumptions result in estimates that predict more rows will be qualified by the query.

17. The article of claim 11, wherein the optimistic selectivity assumptions comprise negative data skew where data is skewed away from predicate conditions.

18. The article of claim 11, wherein the optimistic selectivity assumptions comprise negative correlation among predicate conditions, such that, if one predicate condition evaluates as true, then other predicate conditions tend to evaluate as false.

19. The article of claim 11, wherein the optimistic selectivity assumptions result in estimates that predict fewer rows will be qualified by the query.

20. The article of claim 11, wherein the normal, pessimistic and optimistic selectivity assumptions are weighted differently, with more weight given to the normal selectivity assumptions and less weight given to the pessimistic and optimistic selectivity assumptions.

\* \* \* \* \*